Aug. 7, 1951     N. E. HART ET AL     2,563,723
INDICATOR ADJUSTING MEANS
Filed Feb. 10, 1947
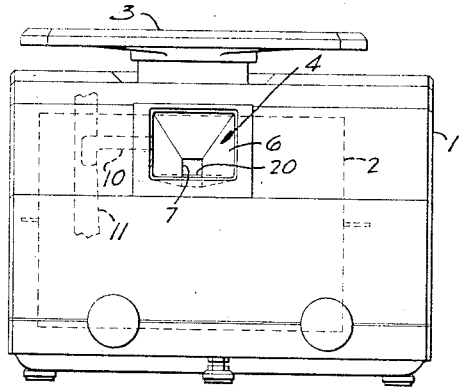
Fig. I
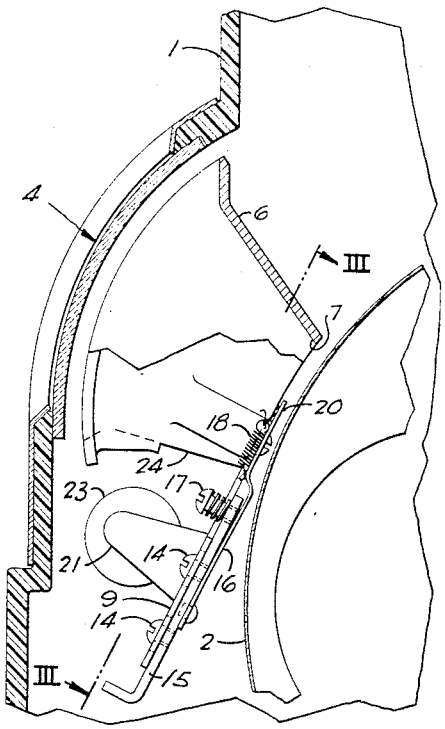
Fig. II
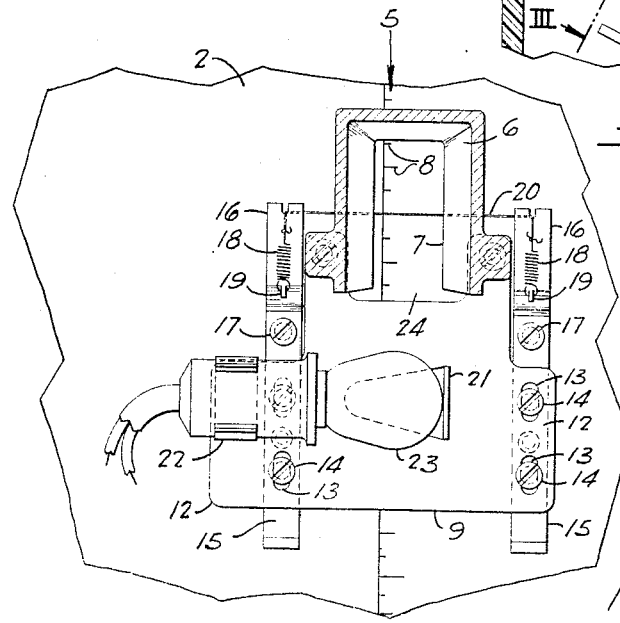
Fig. III
Norman E. Hart
William A. Guss
INVENTORS
BY
Marshall and Marshall
ATTORNEYS Patented Aug. 7, 1951

2,563,723

UNITED STATES PATENT OFFICE 2,563,723

INDICATOR ADJUSTING MEANS

Norman E. Hart and William A. Guss, Toledo, Ohio, assignors to Toledo Scale Company, Toledo, Ohio, a corporation of New Jersey Application February 10, 1947, Serial No. 727,558

3 Claims. (Cl. 116—129)

This invention relates to mounting means for an indicator which is employed with an instrument having a rotatable cylindrical chart on which indicia are arranged in a circumferentially extending series. The mounting means are particularly designed for employment with a cylinder type weighing scale and provide mechanism by which a fine line index may be adjustably positioned closely adjacent the periphery of the cylindrical chart of such an instrument with each end of the index individually adjustable not only with respect to its spacing from the periphery of the chart but also with respect to its parallelism to the chart axis.

It is highly desirable that the index line used with a chart of this general type be positioned as closely adjacent the periphery of the chart as possible to obviate errors in reading the closely spaced indicia resulting from parallax. It also is desirable that the index extend perpendicularly to the line of movement of the indicia on the chart so that each indicia line falls directly beneath the index line.

It is the principal object of this invention to provide index mounting means which will support a line index so as to permit each end of the line index to be individually adjusted both radially of a cylindrical chart and circumferentially of the chart.

More specific objects and advantages will be apparent from the drawings, in which:

Figure I is a view in elevation of a cylinder type weighing scale equipped with index mounting means embodying the invention.

Figure II is a fragmentary transverse vertical sectional view through a customer's index and mounting means embodying the invention.

Figure III is a fragmentary view partly in section and partly in elevation taken substantially from the position indicated by the line III—III of Figure II.

A weighing scale with which the index mounting means embodying the invention is adapted to be employed may have a housing 1 which contains a cylindrical chart 2 revoluble in response to weights placed upon a platform 3. Indication of weight may be afforded on one side of the scale by a viewing window 4 which overlies a circumferentially extending row of indicia 5 (Figure III) on the surface of the chart 2. The window 4 is located at the outer end of a viewing funnel 6 having a substantially smaller open inner end 7 positioned above, and through which is visible, the indicia 8 in the series of indicia 5. A plate 9 is mounted on the viewing funnel 6 which in turn is supported by an arm 10 mounted upon a post or bracket 11 inside the housing 1.

The plate 9 has a pair of laterally extending tabs 12 each having a pair of elongated slots 13 through which extend two set screws 14 that are threaded into a slide 15. A flexible formed finger 16 is riveted to the underside of each of the slides 15 at one end and a spring pressed set screw 17 is threaded through the upper end of each slide 15 bearing against the finger 16 to flex it away from the slide 15 and adjust the free end of the finger toward and away from the periphery of the chart 2 which it overlies. A small coil spring 18 is engaged between a hook 19 punched out of the finger 16 and one end of an index line 20 which is stretched by the two springs 18 across between the free ends of the fingers 16. The index line 20 extends across the open inner end 7 of the viewing funnel 6 overlying the chart 2 and the series of weight indicia 5 to form a reference or index for this series of indicia.

A tab 21 punched out of the plate 9 and a clip 22 secured to the plate 9 serve to mount a lamp 23 which illuminates the chart 2 through an aperture 24 formed in the bottom wall of the viewing funnel 6.

Each of the slides 15 can be moved longitudinally by loosening its set screws 14 and sliding them in the elongated slots 13. This raises or lowers the corresponding end of the index line 20 and thus adjusts its position with respect to the individual indicia lines 8 in the series of indicia 5. Since the series of indicia 5 extends circumferentially around the chart 2 each of its indicia lines 8 must be drawn parallel to the axis of the chart 2 and, similarly, the index line 20 must be accurately positioned above the indicia lines 8 so that when associated with any one of these indicia lines to indicate a specific weight the indicia line will fall directly beneath the index.

By moving both of the slides 15 and fingers 16 vertically the index line can bodily be advanced and retracted with respect to the indicia on the chart 2 to properly position the index line 20 directly above that one of the indicia lines 8 which corresponds to any particular weight on the scale at the time the index line is being positioned or to the zero indicia line if there is no weight on the scale.

By setting the spring pressed set screw 17 each end of the index line and, consequently, the index line as a whole can be moved in closely adjacent the periphery of the chart 2 to eliminate errors due to parallax which results from the eyes of observers being at different levels. If the index line 20 lay directly upon the surface of the chart 2 all observers would read the indicia properly. But since it must be slightly removed from the surface of the chart to permit the chart to rotate it is essential that it be adjustable so that it can be positioned as closely as possible. Irregularities in manufacture and assembly have made it almost impossible to construct fixed index mounting means which will hold indexes close to the peripheries of such charts in all cases.

With the index mounting means embodying the invention it is possible to manufacture a single standard index for all cylinder type weighing scales and to accomplish the individual adjustment for each scale simply, accurately and quickly.

The embodiment of the invention which has been described may be modified to meet various requirements.

Having described the invention, we claim:

1. In an index mounting means for an instrument having a rotatable cylindrical indicia-bearing chart, in combination, a bracket having a portion adjacent the chart, the bracket portion having a generally flat surface lying in a plane that is generally tangential to the cylindrical surface of the chart, a finger mounted on the generally flat surface and having a free end positioned to one side of a band of indicia on the chart, an index line extending from the free end of the finger across said band of indicia in a direction generally parallel to the axis of the rotatable chart, means for slidably adjusting the finger on the bracket portion to adjust the position of the end of the finger in direction generally parallel to the adjacent surface of the chart, and means for deflecting the finger out of the plane of the flat surface of the bracket portion for varying the spacing between the end of the finger and the adjacent surface of the chart.

2. Mounting means for an index that cooperates with a band of indicia on a cylindrical chart comprising, in combination, a bracket having flat portions adjacent the cylindrical surface of the chart and in a plane generally tangent thereto, a pair of resilient fingers mounted on the flat portions of the bracket and having free ends flanking the band of indicia, an index line extending between the free ends of the fingers, means for slidably adjusting the fingers relative to the bracket for moving the ends of the fingers parallel to a plane generally tangent to the adjacent surface of the cylindrical chart, and means that bend the fingers out of the plane generally tangent to the chart for varying the spacing between the ends of the fingers and the adjacent surface of the chart.

3. In an index that cooperates with a band of indicia on a cylindrical chart, in combination, a bracket having flat portions adjacent to the chart and lying in a plane generally tangential to the cylindrical surface of the chart, said flat portions having slotted holes, a stiff finger portion attached to the bracket by means extending through the slotted holes and lying in a plane generally tangential to the chart, a resilient finger portion attached to the stiff finger portion and having an extended end positioned laterally adjacent the band of indicia on the chart, an index line extending from the extended end of the finger across the band of indicia in a direction generally parallel to the axis of the rotatable chart, and means acting between said finger portions to deflect the extended end of the finger toward or away from the adjacent cylindrical surface of the chart.

NORMAN E. HART.
WILLIAM A. GUSS.

REFERENCES CITED

The following references are of record in the file of this patent:

UNITED STATES PATENTS

| Number | Name | Date |
| --- | --- | --- |
| 674,883 | Smith | May 28, 1901 |
| 1,669,428 | Strachan | May 15, 1928 |
| 1,715,838 | Hurt | June 4, 1929 |